(12) United States Patent
von Gutfeld (10) Patent No.: US 6,931,876 B2
(45) Date of Patent: Aug. 23, 2005

(54) APPARATUS AND METHOD FOR UTILIZING RECIRCULATED HEAT TO CAUSE REFRIGERATION

(75) Inventor: Robert Jacob von Gutfeld, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/680,172

(22) Filed: Oct. 8, 2003

(65) Prior Publication Data

US 2005/0076660 A1 Apr. 14, 2005

(51) Int. Cl.[7] .......................... F25B 27/00; F28D 15/00; H05K 7/20
(52) U.S. Cl. ..................... 62/238.3; 62/259.2; 361/688; 165/104.33
(58) Field of Search ............................ 62/238.3, 238.1, 62/259.2; 361/676, 688, 697, 702; 165/104.21, 104.22, 104.33

(56) References Cited

U.S. PATENT DOCUMENTS

| | | | | |
|---|---|---|---|---|
| 4,153,104 A | * | 5/1979 | Ruder ........................ | 165/48.2 |
| 5,383,341 A | * | 1/1995 | Zur et al. ...................... | 62/476 |
| 6,434,955 B1 | * | 8/2002 | Ng et al. ...................... | 62/106 |
| 6,651,443 B1 | * | 11/2003 | Meckler ....................... | 60/783 |

FOREIGN PATENT DOCUMENTS

| | | | | |
|---|---|---|---|---|
| JP | 2000318433 A | * | 11/2000 | ............ B60H/1/32 |
| JP | 2001/253306 A | * | 9/2001 | ........... B60R/16/02 |

OTHER PUBLICATIONS

M. David Burghardt, "Engineering Thermodynamics with Applications", Second Edition, U.S. Merchant Marine Academy, Kings Point, NY, Harper & Row Publishers, New York, pp. 259, 260, and 262.

http://es.epa.gov/ncer/progress/sbir/pollution/68d98131.html, Robert C. Byrd and Michael Garrabrant, "Final Report: Waste–Heat Driven Absorption Transport Refrigerator", National Technology Transfer Center, EPA SBIR Awards 1998, pp. 1–2.

Barton L. Smith, "Converting Excess Heat to Fluid Flow a white paper", Mechanical and Aerospace Engineering Utah State University, pp. 1–5.

Robert C. Byrd, "Waste–Heat Driven Absorption Transport Refrigerator", National Technology Transfer Center, EPA SBIR Awards 1998, pp. 1–2.

* cited by examiner

Primary Examiner—Chen Wen Jiang
(74) Attorney, Agent, or Firm—Stephen C. Kaufman, Esq.; McGinn & Gibb, PLLC (57) ABSTRACT

A cooling apparatus for a system which generates heat therein, includes a chamber for receiving at least a portion of the heat, the chamber containing a refrigerant therein, a condenser for receiving the refrigerant having been heated in the chamber, the refrigerant being pressurized and cooled in the condenser, and at least one coil coupled to the condenser and leading to a region to be cooled. The at least one coil includes a first portion coupled to the condenser, a second portion downstream from the first portion, and a third portion downstream of the second portion. The second downstream portion contains an orifice for free expansion to cause cooling of the region, and the third downstream portion leads from the region to be cooled back to the chamber.

32 Claims, 8 Drawing Sheets

Fig. 4

APPARATUS AND METHOD FOR UTILIZING RECIRCULATED HEAT TO CAUSE REFRIGERATION

CROSS-REFERENCE TO RELATED APPLICATION

The present application is related to U.S. patent application Ser. No. 10/680,233, filed on Oct. 8, 2003, to Hamann et al., entitled "METHOD AND APPARATUS FOR IMPROVING POWER EFFICIENCIES OF COMPUTER SYSTEMS" assigned to the present assignee, and incorporated herein by reference.

BACKGROUND OF THE INVENTION

1. Field of the Invention

The present invention generally relates to an apparatus and method for using waste heat resulting from a thermodynamic process, and more particularly to an apparatus and method which uses at least a portion of the waste heat to cause some degree of cooling in a portion of the same system producing the waste heat.

2. Description of the Related Art

The concept of using waste heat to provide cooling to another device by way of a gas absorption refrigerator has been well known for some time. However, the conventional apparatus and methods have not transferred (or utilized) heat produced from one part of a device or system to another section of the same device or system to provide needed cooling.

Additionally, the conventional techniques have not used an absorption gas refrigerator which uses the waste heat to compress the absorption gas leading to refrigeration upon rapid expansion. There are numerous examples of devices that produce heat in their normal state of operation. Every machine that produces a form of mechanical energy must also produce heat according the laws of thermodynamics. In many cases, this heat can be of such a level that extensive efforts must be made to cool a section of the device, otherwise the heat destroys an important function of the device.

A particular example of large heat generation is found in the operation of computers.

More specifically, large units, such as servers etc., use such a large amount of power in the course of their operation that extensive measures are required to provide adequate heat removal. Without such measures, server components, such as microprocessors and the like, would be destroyed due to excessively high temperatures.

However, prior to the recognition of the problem by the present inventor, there has been no apparatus or method for providing re-circulation of a portion of the waste heat from the device or system, and redirecting the heat to bring about local refrigeration, and in which the cold portion of the refrigeration apparatus is directed in turn to a different part of the system that requires cooling.

SUMMARY OF THE INVENTION

In view of the foregoing and other exemplary problems, drawbacks, and disadvantages of the conventional methods and structures, an exemplary feature of the present invention is to provide a method and structure in which a portion of heat generated within a device or system is recirculated, and is redirected to bring about local refrigeration of a region of interest.

In a first exemplary aspect of the present invention, a cooling apparatus which generates heat therein, includes: a chamber or generator for receiving at least a portion of the available waste heat from a device or system, the chamber containing a refrigerant therein, a condenser for receiving the refrigerant having been heated in the chamber, the refrigerant being pressurized and cooled in the condenser, and at least one coil coupled to the condenser and leading to a region to be cooled. The at least one coil includes a first portion coupled to the condenser, a second portion downstream from the first portion, and a third portion downstream of the second portion. The second downstream portion contains an orifice for free expansion to cause cooling of the region, and the third downstream portion leads from the region to be cooled back to the chamber.

In a second exemplary aspect of the present invention, a cooling apparatus which generates heat therein, includes a chamber for receiving at least a portion of the heat, and containing a refrigerant, a condenser coil located at a distance from the region of the device to be cooled, the condenser cooling coil receiving the heated refrigerant from the chamber, the refrigerant being pressurized due to heating and is cooled and liquefied in the condenser, and one or more coils leading out from the condenser to a region to be cooled, the ends of the one more coils opposite from the condenser being affixed to region to be cooled, the opposite end containing an orifice for a free expansion to cause cooling of the region, the coils continuing from the region to be cooled back to the chamber.

In a third exemplary aspect of the present invention, a method for cooling an apparatus which generates heat therein, includes receiving at least a portion of the heat in a chamber, the chamber containing a refrigerant therein, receiving, by a condenser, the refrigerant having been heated in the chamber, the refrigerant being pressurized and cooled in the condenser, and coupling at least one coil to the condenser and leading the at least one coil to a region to be cooled, the at least one coil having a first portion coupled to the condenser, a second portion downstream from the first portion, and a third portion downstream of the second portion. The second downstream portion contains an orifice for free expansion to cause cooling of the region, and a third downstream portion leads from the region to be cooled back to the chamber.

With the unique and unobvious combination of features of the present invention, an apparatus and method for using waste heat resulting from a thermodynamic process, are provided.

The apparatus (and method) advantageously uses at least a portion of the heat to cause some degree of cooling in a portion of the same device or system which produces the waste heat.

Thus, a portion of the waste heat is recycled from the device or system, and redirected to a section of the same device or system that requires cooling.

Such a concept of the invention has many applications, and is not limited to the exemplary embodiment and application in which heat produced by large computer systems, such as computer server units, is addressed. In this application, it is important to provide cooling for the microprocessors, and the need for additional microprocessor cooling continues to grow as increasing chip circuit density gives rise to ever increasing chip temperatures. However, the invention is certainly not limited to this application, as would be evident to one of ordinary skill in the art taking the present application as a whole. A basic advantage of the present method is that waste heat, which would otherwise not be useful heat, is used in a way that may make a device or system which is otherwise unusable due to overheating, usable by integrating the waste heat to become a part of a refrigeration apparatus to cool the device or system.

BRIEF DESCRIPTION OF THE DRAWINGS

The foregoing and other purposes, aspects and advantages will be better understood from the following detailed description of an exemplary embodiment of the invention with reference to the drawings, in which:

FIGS. 2B–2D illustrates the absorption gas refrigeration cycle in greater detail, and more specifically:

DETAILED DESCRIPTION OF EXEMPLARY EMBODIMENTS OF THE INVENTION

Referring now to the drawings, and more particularly to FIGS. 1–4, there are shown exemplary embodiments of the method and structures according to the present invention.

Exemplary Embodiment

As mentioned above, the present invention describes an apparatus and means for using waste heat resulting from a thermodynamic process occurring in a device or system, and specifically the apparatus uses at least a portion of the heat from the device or system to cause some degree of cooling in a portion of the same device or system producing the waste heat. In this manner a portion of the waste heat is recycled, and redirected to a section of the device or system that requires cooling.

As mentioned above, while the invention has many applications, for the reader's clarity and understanding only, and not for limiting the present invention in any way, the present application will describe an exemplary embodiment of heat produced by large computer systems such as computer server units. Indeed, the present inventor has recognized that providing cooling for microprocessor systems is vitally important and the need for inexpensive additional microprocessor cooling will continue to grow as increasing chip circuit density gives rise to ever increasing chip temperatures.

As is well known from thermodynamics, it takes energy to move heat from a colder temperature to a relatively hotter temperature. From an efficiency perspective, the amount of energy removed from a colder region to a hotter region can be greater than 1. Indeed, experimentally it has been shown to be as high as 3–4 for a typical, reversed Carnot cycle engine such as a conventional refrigerator. The ideal coefficient of performance (COP) for such a refrigerator is $$COP=Q_H/W \qquad (1)$$

where $Q_H$ is the heat delivered to a hot reservoir of the Carnot cycle engine and W is the mechanical work to achieve this delivery. The expression can be written in terms of two absolute temperatures, $$COP=T_H/(T_H-T_c) \qquad (2)$$

where $T_c$ is the relatively cooler temperature (e.g., in the present exemplary case the computer chip to be cooled). Clearly, the COP for this situation is always greater than 1 (i.e., more heat is removed than the amount of work expended to remove it).

Here, the present invention uses the heat from certain parts of a device or system, for example, one or more server power supplies or computer chips to supply the heat, rather than work to an absorption gas refrigerator to remove the heat from a heated neighboring region not necessarily directly connected to the source of heat used for refrigeration. For computers, the heat may be best transferred to the generator of the absorption gas refrigerator by forced air convection since direct contact of the heat source to the generator may not properly transfer the heat to the generator. However, this is not true in general for those conditions where the generator runs at a lower temperature than the heat being supplied by the heat source. In that case, heat may be transferred by conduction from the heat source to the generator of the gas refrigerator.

For example, the heat from motors of cooling fans or power supplies may be re-directed to run the equivalent of an absorption gas refrigerator. The absorption gas refrigerator (which may be completely without motor or a need for an electrical source for operation) is well-known and operates by supplying heat to a solution (e.g., a lithium bromide (LiBr)/water, ammonia/water, lithium chloride/water, ammonia/water/hydrogen or the like). It is noted that, in using the LiBr/water (or the lithium chloride/water), in the refrigeration operation the water boils off and performs the cooling, whereas in the ammonia/water refrigerant it is the ammonia which boils off, becomes compressed and liquefied, to perform the cooling. A small power efficient motor may be used to recombine the ammonia and water or, hydrogen, a third gas may be used.

Figure 1:
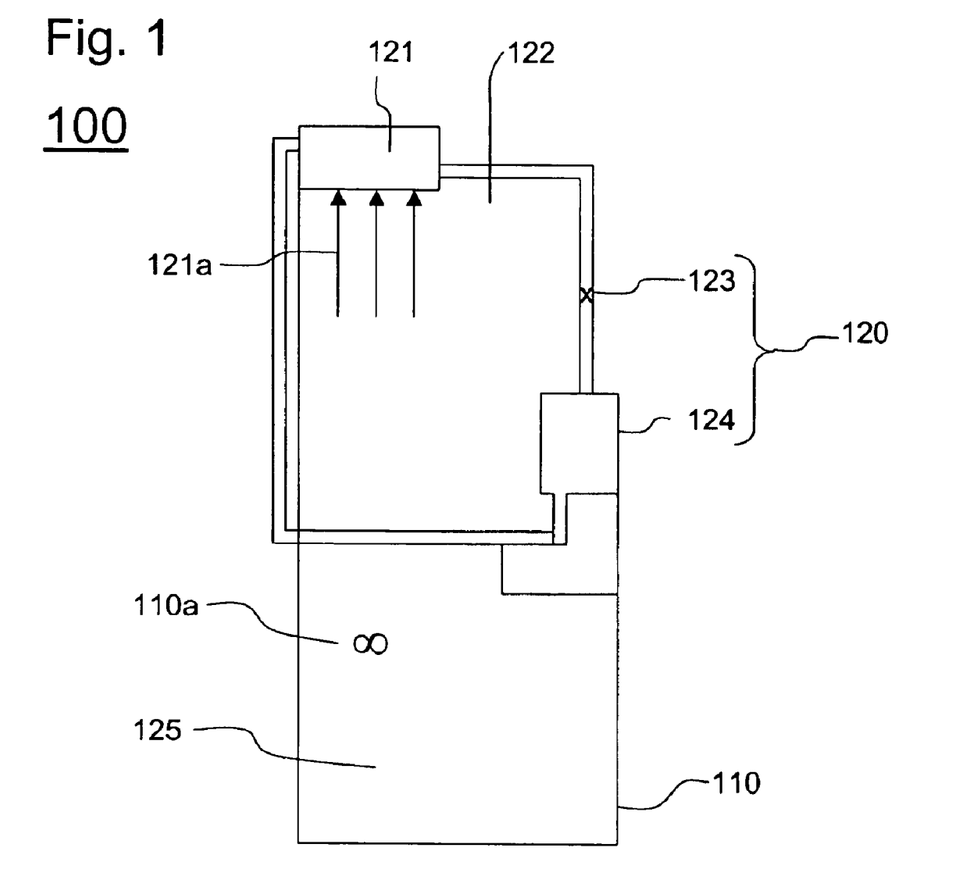
FIG. 1 illustrates a schematic of a structure 100 including a server rack with an absorption gas refrigerator receiving heat from the hot air used to ventilate or cool the entire system.

Turning to FIG. 1, a refrigeration structure 100 is shown according to the present invention in an exemplary application, and more specifically, a heat-emitting device or system (e.g., a server rack and the related electronic components thereof; while the invention can be applied to many heat emitting devices, for consistency and the reader's clarity hereinbelow, a server rack will be described) 110 being cooled with an absorption gas refrigerator 120.

The gas refrigerator 120 is mounted preferably adjacent (e.g., and more preferably on top) of the server rack 110.

The gas refrigerator 120 includes a heating chamber 121 which captures the radiated or forced air waste heat 121a from some portion of the server rack 110. Again, the waste heat may come from the electronics which supply power to the processor chips, such as from the auxiliary components used to drive the chips such as the amplifiers, computer chips, current supplies, etc. This is the waste heat which is desirably used to be recirculated and used for cooling and is generally delivered to the generator by forced air convection.

As is well known in the art of absorption gas refrigerators, coupled to the relatively hot heating chamber 121 is a condenser 122. The condenser 122 may be a tube, coil, etc. and includes therein a pressurized and cooled liquid (refrigerant) therein.

The condenser 122 is coupled to an expansion stage (e.g., cooling coil 124). Some gas refrigerators may use an expansion (or throttling) valve 123. In a portion of the cooling coil 124 adjacent the optional expansion valve 123, a gaseous vapor is provided (e.g., lithium bromide and water; ammonia and water; ammonia, water and hydrogen, etc.), thereby to provide cooling. Thus, it is noted that not all gas refrigerators use or operate with such expansion/throttling valves. More generally, in the evaporator section, the refrigerant evaporates to cause cooling. In some cases, this involves a rapid expansion using a throttling valve, but this is not required in all types of gas refrigerators.

The cooling coil 124 is preferably in the region of interest (e.g., the processor chips), thereby to cool the same.

The cooling coil 124 after traversing past the processor chips is in turn coupled back to the heating chamber 121.

As discussed in further detail below with regard to FIG. 2A, the basic principles of heater-based absorption gas refrigerators include an absorption cycle in which a refrigerant is expelled from a solution as a gas in a heating compartment, followed by passage through a separator unit to separate the water from the refrigerant (not shown in detail in the drawings), and then followed by a condensation cycle in which the refrigerant returns back to a liquid.

Thus, as shown in FIG. 1, in the present invention, the condenser 122 is preferably located outside of the server unit 110 to radiate heat away from the server, and turn the gas into a liquid via a cooling process.

This operation is followed by an evaporation cycle which takes place by expansion (e.g., again in some cases, a rapid expansion made possible by a throttle/expansion valve 123) and in some cases an interaction with hydrogen. This process requires the heat of vaporization be supplied to the refrigerant which comes from the body to be cooled (e.g., in the case of the exemplary, non-limiting application, a series of processor chips). This portion of the gas refrigerator (similar to all refrigerators) is the evaporator section (e.g., shown adjacent to reference numeral 124, which is adjacent the region which is desired to be cooled).

In an exemplary embodiment, the condenser 122 can be located anywhere away from the region to be cooled (e.g., on top of the server rack 110 in conjunction with a cooling fan 10a).

The condenser 122 leaves the liquid refrigerant under pressure, but provides considerable cooling to the refrigerant. The release of the pressurized liquid into the evaporator (e.g., a low pressure region), by expansion (again possibly by means of the expansion or throttle valve 123) causes cooling as the heat of vaporization is taken from the surroundings.

In the present invention, if optionally employed, the expansion valve 123 may be positioned near the processor chips 125, while tubulation (e.g., tubes, coils, etc.), in which the expansion occurs, is preferably in direct contact with the chips or a standard copper cooling hat in contact with the chips through an interface.

Figure 2A:
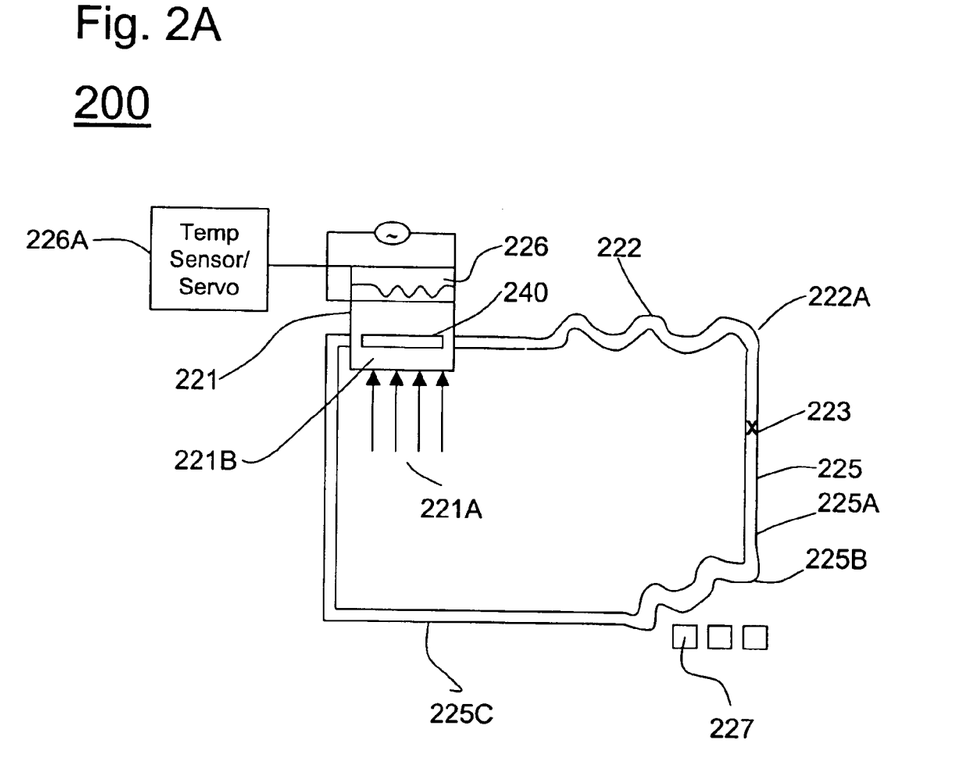
FIG. 2A illustrates very schematically an absorption gas refrigeration cycle 200.

Referring now to FIG. 2A, the gas refrigerator cycle 200 (and structure thereof) according to the present invention, will be described in greater detail.

In FIG. 2A, the waste heat 221a radiated by a server rack 250 (shown in FIG. 2C) including power amplifiers 251 (shown in FIG. 2C) (and processor chips 227), is collected in a heating chamber, the generator, 221, generally by forced air convection. In the heating chamber 221 at reference numeral 221b, there is water and refrigerant from the previous cycle (e.g., hot water ($H_2O$) and ammonia ($NH_3$), in one embodiment).

An ancillary electric heater 226 may be provided preferably above the heating chamber 221. Such a heater 226 is important for immediately allowing "instant" heat and thus the cooling to occur.

That is, when a server unit first becomes operational, it may take some time to heat up and make the inventive apparatus operational. Thus, the refrigerator may take a while to operate, as it may take some time for the heat from the various components to build up. In such a case, the electric heater 226 can be turned on to heat quickly the generator area, thereby allowing the apparatus to be operational without waiting for the server rack to supply the heat. Hence, the instant heat would provide quicker compression to the gas (and thus quicker cooling capability).

Such an ancillary electric heater 226 is preferably coupled to a temperature sensor 226a having a servo unit which serves to decrease optimally the heat being output from the ancillary electric heater 226 as the server rack/components heat up. Thus, a temperature sensor 226a, which senses the temperature of the gas, operates the servo mechanism to turn the electric heater 226 down (or up) to an optimum value (or to nothing).

It is noted that, some heat from the ancillary electric heater 226 always may be required depending upon how hot the gas from the server unit becomes. That is, there may be heat being generated by the server unit, but depending upon a number of environmental factors, it may not be of sufficient temperature, quantity or duration for the inventive apparatus and system to operate efficiently or optimally. Thus, the ancillary electric heater 226 would be advantageous to supplement the heat from the server unit.

A condenser 222 is coupled to the heating chamber 221 at a side or preferably above the heating chamber 221.

Within the condenser 222 at reference numeral 222a, there is pressurized, and cooled ammonia (e.g., $NH_3$ or another refrigerant).

An optional expansion valve 223 (e.g., also known as a "throttle valve") may be provided downstream of the condenser 222. If employed, the expansion valve 223 allows the pressurized and cooled ammonia to expand downstream of the valve 223 (e.g., in the evaporator/cooling coil), thereby to form gaseous $NH_3$ at reference numeral 225a. Again, the valve may not be employed. The important aspect is that, in the evaporator section, the liquid refrigerant undergoes at least some evaporation to cause cooling.

The cooling coil 225 downstream of the expansion valve 223 is positioned within the near vicinity 225b of the processor chips 227, thereby to cool the same. This portion of the coil may be in contact with the computer chips to be cooled (e.g., as shown in exemplary FIG. 3A), may be in contact or run through a chip cooling hat (e.g., as shown in FIG. 3B) or may be used to chill water that runs near or in contact with the computer chips, as shown in FIG. 3C.

The cooling coil 225 then returns to the heating chamber 221.

Hence, heater-based refrigerators use an absorption cycle including a refrigerant which is thermally driven out of solution as a gas in a heater or generator section.

In the present invention, this heat to drive the refrigerant out of solution is provided by the waste heat 221a that is available from one portion of an apparatus (e.g., power supplies or fans of a server unit).

After heating the gas, it is made to condense into a liquid in the condenser unit 222, and then evaporates back into a gas in an evaporator unit (e.g., the coiling downstream of an optional expansion valve/throttle, in the region of interest to be cooled), a unit that is common to all refrigeration units.

The refrigerant finally goes back into solution in an absorption unit (e.g., downstream of the evaporator unit where the ammonia (or water in the case of the lithium bromide/water and lithium chloride/water refrigerants) gets reabsorbed.

The cooling effect comes during the evaporation in the evaporator unit since converting a liquid to a gas requires latent heat which, in the present case, is heat extracted from parts surrounding the evaporator.

Typically, an absorption-cycle gas refrigerator (e.g., such as the schematic illustrated in FIG. 2A, but which does not show the details of the absorption portion, which are known and vary according to the gas mixtures) uses a solution of lithium bromide (LiBr) in water, lithium chloride in water, or a mixture of ammonia in water, in some cases with hydrogen. In the case of the ammonia refrigerant and water, the ammonia becomes heated in the generator or heating chamber and turns into a pressurized vapor.

The refrigerant vapor enters a separator 240 (e.g., in FIG. 2A) to separate water from the refrigerant. That is, in the up cycle, the heat causes the water and the ammonia to become hot, and the separator 240 functions so that the water returns to the heating chamber 221 while the ammonia passes downstream to the condenser unit 222. Thus, the separator is used in the up-cycle, and then there is a mixing of the ammonia and water after the evaporation (cooling) stage.

Hence, after separation, the ammonia passes through the condenser unit 222 where it gives off heat to the surroundings, and then reverts to a pressurized liquid due to the cooling in the condenser.

This liquid refrigerant enters an evaporator and in so doing undergoes a free expansion (e.g., in some exemplary cases, via an optional expansion valve 223) which takes, from the surroundings, the heat of vaporization, thereby resulting in the cooling of the surroundings. This relatively cool vapor then re-enters the generator (e.g., heating chamber) to continue to cycle.

In another exemplary, non-limiting embodiment in which liquid bromide in water are used as the refrigerant, the cycle is somewhat more complicated, but is basically similar to that which occurs for the ammonia cycle, except that the water vapor is separated from the LiBr, and it is the water vapor that passes through the condenser 222 and evaporator stage, and ultimately causes the cooling.

For the inventive system, an ideal expression that describes the coefficient of performance (COP) is given by:

$$COP = [T_L/(T_M - T_L)][(T_H - T_M)/T_H] \quad (3)$$

where $T_M$ is the temperature of the heat sink receiving heat principally from the condenser 222.

$T_H$ is the temperature of the generator or heating chamber 221 for the refrigerant resulting from the entry of the waste heat provided in the invention by the heated portions of the server unit, usually but not necessarily from portions other than the chips to be cooled. This is the heat that drives refrigeration cycle, and $T_L$ is the cold temperature resulting from the free expansion in the evaporator stage (e.g., the region of cooling), in the exemplary embodiment of the invention, the temperature of the cooled computer processor chips which provide the heat for the gas expansion in the evaporator unit.

Figure 2B:
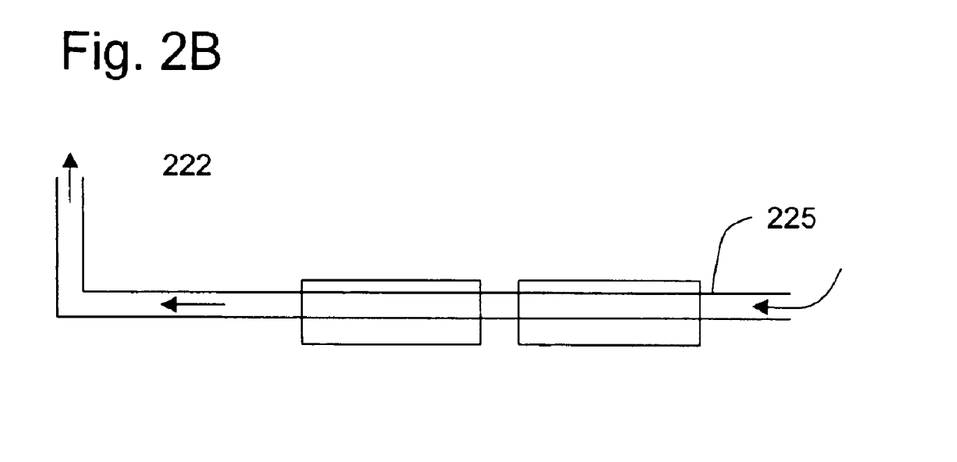
FIG. 2B illustrates a mechanism for extracting heat for compression.
Figure 2C:
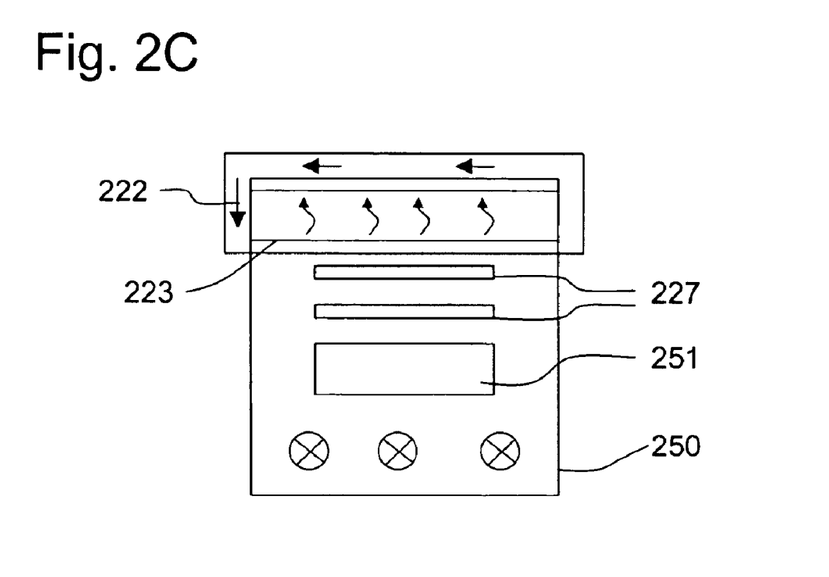
FIG. 2C illustrates a generator receiving heat from, for example, fan blow-off from a server unit.
Figure 2D:
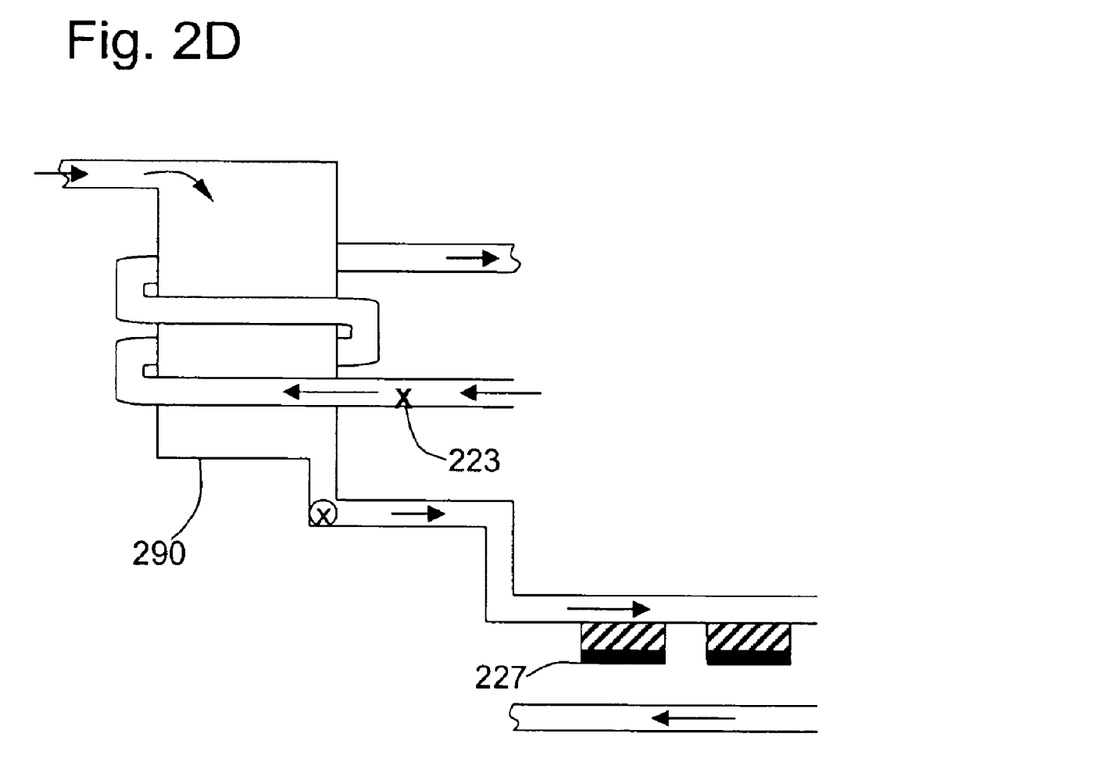
FIG. 2D illustrates use of a medium chilled by the absorption gas refrigerator, the medium used to cool computer chips.

FIGS. 2B–2D illustrate the above-described absorption gas refrigeration cycle in greater detail. More specifically, FIG. 2B illustrates the mechanism for extracting heat for compression, and specifically the cold gas (refrigerant) flowing by the power amplifiers (which represent at least a portion of the waste heat source). The cold gas flowing though the tubing flows past the power amplifiers and serves as part of the heat delivered to the generator as compressed gas for subsequent input to the condenser 222.

FIG. 2C illustrates the compressed gas flowing within the generator to the condenser, and specifically the generator receiving heat from, for example, the fan blow-off from the server unit.

FIG. 2D illustrates the invention's use of the medium (e.g., water) already chilled by the absorption gas refrigerator. As shown, the water tank 290 is shown together with tubulation containing a water pump 223, with the chilled water going past the chip and optional cooling hat for cooling purposes. The warm water return (e.g., the water being warmed after the cooling of chip/optional cooling hat) is shown. The now heated water is returned to the evaporator of the absorption gas refrigerator and then after cooling returns to the tank completing the heating/cooling cycle.

Figure 3A:
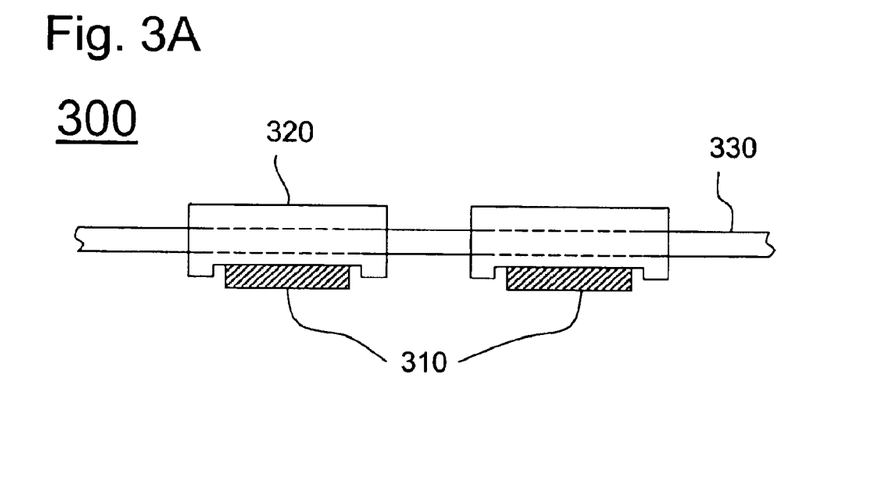
FIG. 3A illustrates in greater detail an arrangement 300 of the cooling of the region of interest (e.g., computer chips 310)
Figure 3B:
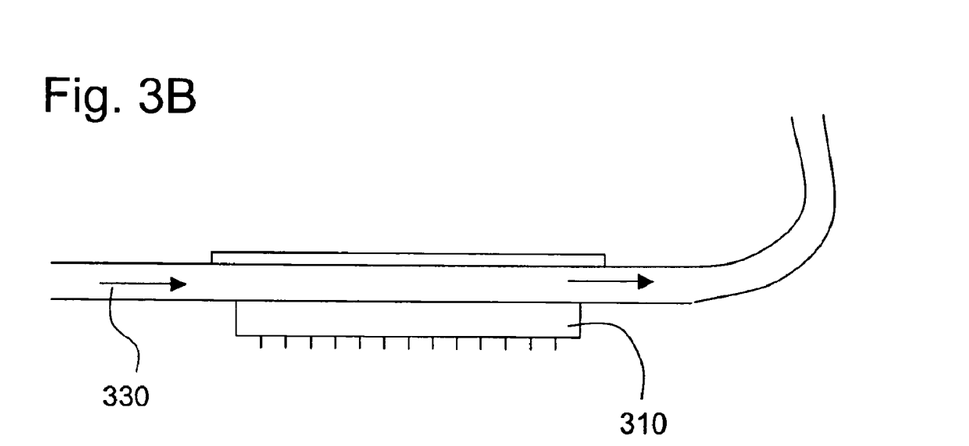
FIG. 3B illustrates another embodiment of an arrangement 350 of the cooling of the region of interest (e.g., computer chips 310) in which direct contact occurs between the coil unit and the computer chip 310.
Figure 3C:
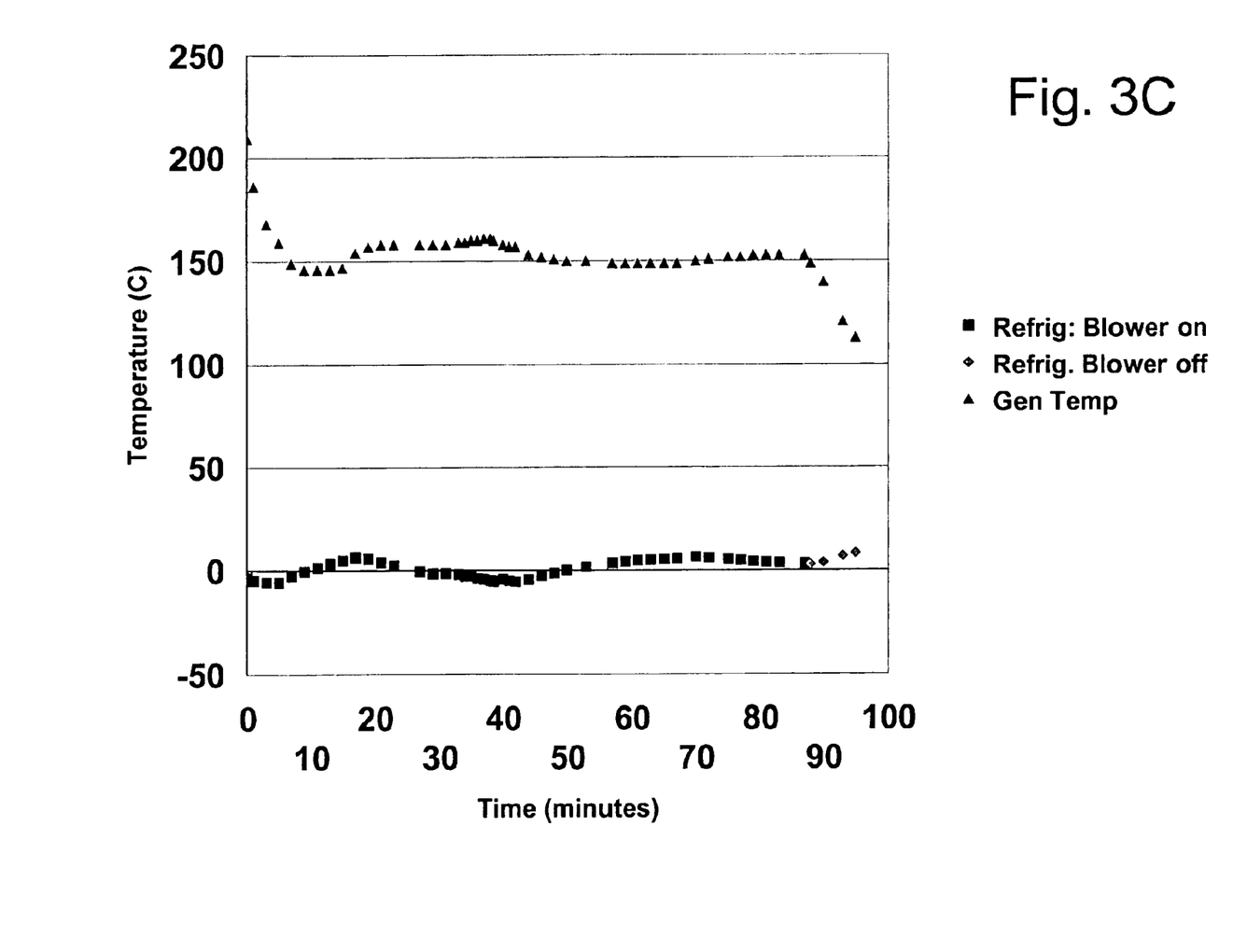
FIGS. 3C and 3D respectively illustrate a graph of a refrigerator cooling curve, and a graph showing a set of curves showing both the refrigerator temperature and the generator/boiler temperature producing the compression plotted on the same graph as a function of time.

FIG. 3A illustrates an exemplary configuration 300 for cooling processor chips 310, and specifically how the chips 310 may be in contact with the cooling medium. Obviously, there are many embodiments and configurations of how the chips would be in contact with a cooling coil 330 and which would be possible to use in the present invention.

Indeed, the cooling from the gas refrigerator may be used to cool the chip by direct contact (e.g., as shown in FIG. 3B) or by cooling water that then flows in a conduit in contact with the chip for which experimental data of cooling temperatures of a gas refrigerator evaporator as a function of generator temperature are shown in FIG. 3C. The increased generator temperature is obtained by using forced hot air from a hot air gun. Alternatively, as shown in FIG. 3A, the cooled water can flow through the cooling hat with other configurations obvious to those skilled in the art after reading the present specification.

In FIG. 3A, the chips 310 are shown having a cooling hat 320 (e.g., typically made from a conductive member such as copper or the like) thereon, and through which (or adjacent thereto) an expansion cooling coil 330 traverses. The copper cooling hat 320 may have fins thereon and a fan (e.g., similar to fan 110a shown in FIG. 1) may be advantageously used to blow on the fins to dissipate the heat.

Thus, in FIG. 3A, the coolant passes through expansion cooling coil 330, passing directly through the copper cooling hat 320, which is in contact with the chips 310 (e.g., the chips forming an array), thereby cooling the chips 310. The chips 310 typically are inserted into boards, and again the tubing may be within the cooling hat 320, or the chips may be contacted directly with the expansion cooling coil 330.

With the use of the copper cooling hat 320 contacting the chips 310, typically a viscous grease is placed between the copper cooling hat and the chip, and, with a relatively high pressure (e.g., 80 lbs./in$^2$), the cooling hat is pressed onto the chip. Thus, typically after the pressure is applied, the grease film making the contact between the cooling hat and the chip is on the order of 50 to 100 microns in thickness. This film represents a great challenge in reducing the amount of heat dissipated, and thus the invention can use a direct contact between the chip and the cooling coil which increases the cooling efficiency.

That is, FIG. 3B illustrates another embodiment of an arrangement 350 of the cooling of the region of interest (e.g., computer chips 310) in which direct contact occurs between the coil unit and the computer chip 310. Thus, cold water 330 is provided and flown directly over a surface of the chip 310 thereby to cool the chip and exit the area of interest as hot water.

Figure 3D:
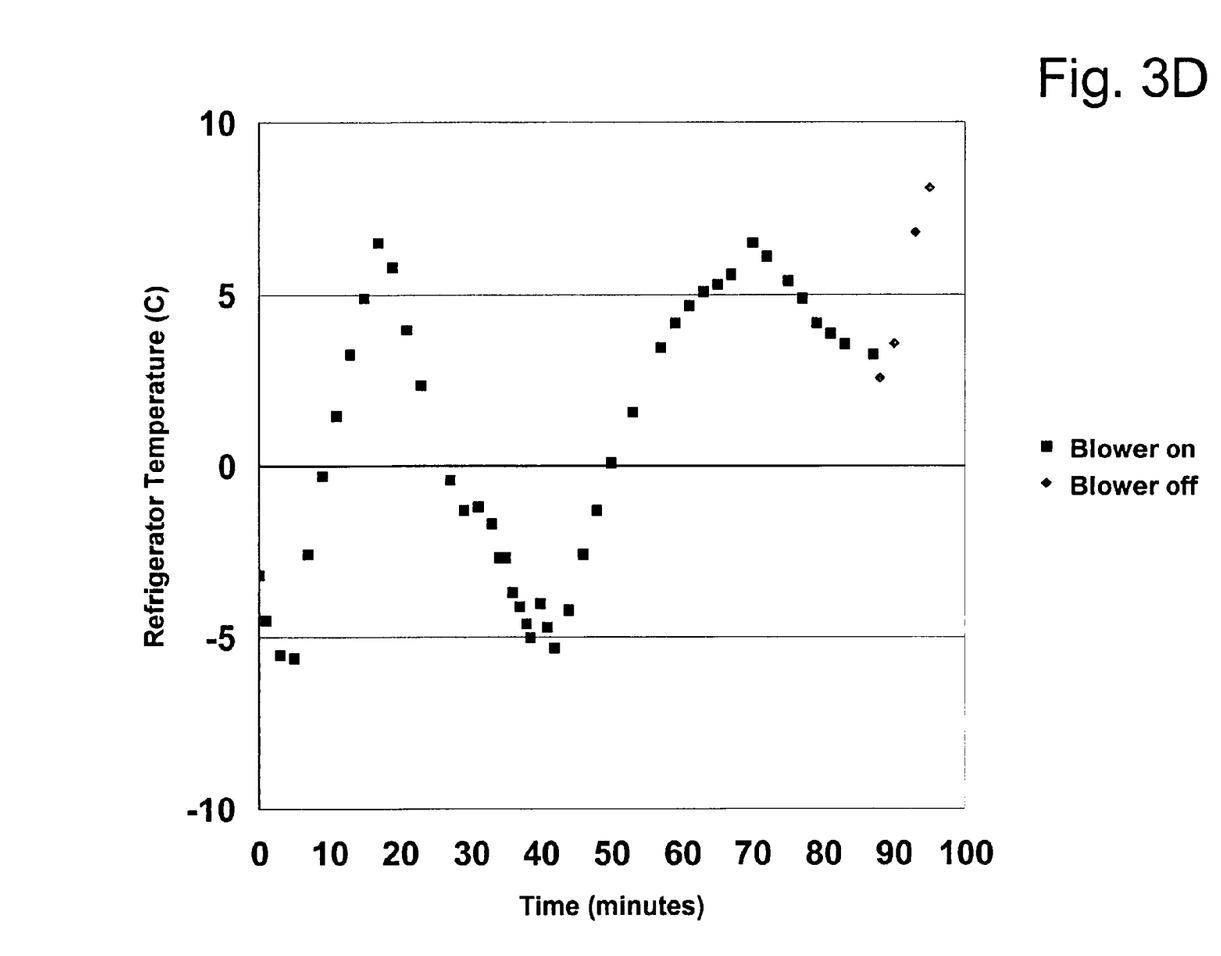

FIG. 3C, as already mentioned above, and 3D respectively illustrate graphs of refrigerator cooling curve, and a graph showing a set of curves showing both the refrigerator temperature and the generator temperature producing the compression plotted on the same graph as a function of time.

Thus, FIG. 3C shows a refrigerator cooling curve with refrigerator and generator temperature as a function of the time that the generator is driven by the "waste heat". In this experiment, the system was started by the use of an electric heater.

FIG. 3D illustrates a second relationship showing both the refrigerator temperature and the generator temperature producing the compression plotted on the same graph as a function of time. For FIG. 3D, the fluctuations in temperature are due to the deliberate variations in the generator temperature produced by varying the distance between the generator and the heat gun.

As mentioned above, for the experiment, the electrical heater that is an optional part of the refrigerator mechanism was used to start the refrigeration cooling cycle. Once the requisite elevated temperature of the generator was reached, the electrical heater was disconnected, and a heat gun was used, positioned at various distances (hence the fluctuations in temperature) from the generator, to maintain the cooling cycle. The heat gun served to simulate the recycled waste heat that would normally come from the waste heat of the server. The minimum evaporator temperature attained using the heat gun was −5.5C., though slightly lower temperatures are possible. Thus, the electrical heating started the cycle, followed by switching to simulated waste heat.

Figure 4:
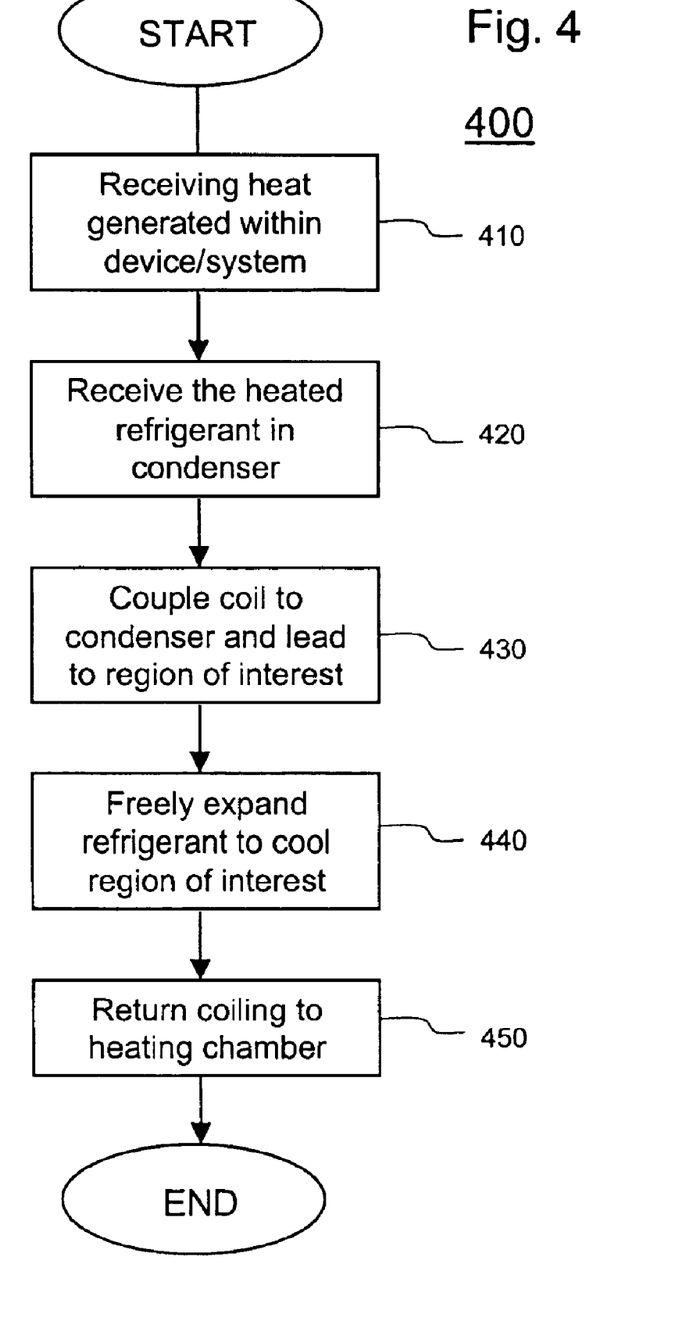
FIG. 4 illustrates a flowchart of an exemplary method 400 according to the present invention.

FIG. 4 illustrates the inventive method 400 of cooling an apparatus which generates heat therein.

The method 400 includes, in step 410, receiving at least a portion of the heat generated within the system, principally by heat convection by a chamber (refrigerator generator), the chamber containing a refrigerant therein.

In step 420, a condenser receives the refrigerant having been heated in the chamber, the refrigerant having been pressurized and subsequently cooled in the condenser.

In step 430, at least one coil is coupled to the condenser and leads to a region to be cooled, the at least one coil having a first portion coupled to the condenser, a second portion downstream from the first portion, and a third portion downstream of the second portion.

In step 440, by virtue of the second downstream portion containing an orifice for free expansion, the ammonia undergoes a free expansion (optionally via a throttle or expansion valve) to cause cooling of the region of interest.

In step 450, by virtue of the third downstream portion leading from the region to be cooled back to the chamber, the next cooling cycle can begin.

Thus, as described above, the present invention provides an apparatus and method for using waste heat resulting from a thermodynamic process occurring within a device or system, the system including the apparatus to provide cooling to parts of the device or system from the waste heat produced from at least part of the device or same system.

According to the present invention, the apparatus and method advantageously uses at least a portion of the heat to cause some degree of cooling in a portion of the same apparatus producing the waste heat.

Further, at least a portion of the waste heat is recycled, and is redirected to a section of the device that requires cooling (e.g., processor chips in the exemplary, non-limiting embodiment).

Such a concept of the invention has many applications, and is not limited to the exemplary embodiment and application in which heat produced by large computer systems, such as computer server units, is addressed.

Indeed, other exemplary applications may include recirculating heat from automobiles to cool the passenger compartment. Again, the invention obtains the heat from the system itself (e.g., in situ). Hence, the invention uses heat from within, and redistributes the heat from within.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A cooling apparatus for a system which generates heat therein, said apparatus comprising:
   a chamber for receiving at least a portion of said heat, by at least one of conduction and forced air, said chamber containing a refrigerant therein;
   a condenser for receiving said refrigerant having been heated in said chamber, said refrigerant being pressurized and cooled in said condenser; and
   at least one coil coupled to said condenser and leading to a region to be cooled, said at least one coil having a first portion coupled to said condenser, a second portion downstream from said first portion, and a third portion downstream of said second portion,
   wherein said second downstream portion contains an orifice for free expansion of the refrigerant to cause cooling of said region to be cooled,
   wherein said third downstream portion leads from the region to be cooled back to said chamber, and
   wherein said at least a portion of said heat generated within the system is recirculated to cool said region to be cooled.

2. The cooling apparatus of claim 1, wherein said refrigerant comprises any of ammonia and water, a solution of lithium bromide and water, and a solution of lithium chloride and water.

3. The cooling apparatus of claim 1, wherein a source of heat comprises heat from a component within said system that becomes heated when said system is powered.

4. The cooling apparatus of claim 1, wherein a structure in said region to be cooled comprises at least one of a fan and a fan motor, at least one computer chip, computer circuitry and a circuit board, said structure being electrically powered.

5. The cooling apparatus of claim 1, wherein a structure in said region to be cooled comprises a computer server unit.

6. The cooling apparatus of claim 1, further comprising:
   an auxiliary electric heater coil being positioned adjacent to said chamber receiving said heat.

7. The cooling apparatus of claim 6, wherein said auxiliary electric heater coil starts a refrigeration cycle.

8. The cooling apparatus of claim 6, wherein said auxiliary electric heater coil remains actuated during operation of a structure producing heat to augment said heat being provided to said chamber.

9. The cooling apparatus of claim 1, wherein said second downstream portion of said at least one coil is directly contacted with a structure to be cooled.

10. The cooling apparatus of claim 1, further comprising a solid conduction member, wherein said second downstream portion of said at least one coil is indirectly contacted with a structure to be cooled, via said solid conduction member.

11. A cooling apparatus for a system which generates heat therein, comprising:
a chamber for receiving heat generated within the system, and containing a refrigerant; and
a condenser located at a distance from a region of a device to be cooled,
wherein said condenser receiving said refrigerant having been heated from said chamber, said refrigerant being pressurized due to heating and being cooled and liquefied in said condenser,
wherein at least one coil leading out from said condenser to a region to be cooled,
wherein one end of said one or more coils containing an orifice for free expansion of said refrigerant to cause cooling of said region to be cooled,
wherein said at least one coil leading from said region to be cooled back to said chamber, and
wherein said at least a portion of said heat generated within the system is recirculated to cool said region to be cooled.

12. The cooling apparatus of claim 11, wherein said refrigerant comprises any of ammonia and water, a solution of lithium bromide and water, and a solution of lithium chloride and water.

13. The cooling apparatus of claim 11, wherein said heat is generated by a component within said system that becomes heated when said system is powered.

14. The cooling apparatus of claim 11, wherein a structure in said region to be cooled comprises at least one of a fan and a fan motor, a computer chip, computer circuitry and a circuit board, said structure being electrically powered.

15. The cooling apparatus of claim 11, further comprising:
an auxiliary electric heater coil positioned adjacent to said chamber receiving said heat.

16. The cooling apparatus of claim 15, wherein said auxiliary electric heater coil starts a refrigeration cycle.

17. The cooling apparatus of claim 15, wherein said auxiliary electric heater coil remains actuated while said heat is generated in said system to augment said heat being provided to said chamber.

18. The cooling apparatus of claim 11, wherein a downstream portion of said at least one coil is directly contacted with a structure to be cooled.

19. The cooling apparatus of claim 11, further comprising a solid conduction member,
wherein a downstream portion of said at least one coil is indirectly contacted with a structure to be cooled, via said solid conduction member.

20. A method for cooling a portion of a system which generates heat therein, comprising:
receiving at least a portion of said heat generated within the system, in a heating chamber, said heating chamber containing a refrigerant therein;
receiving, by a condenser, said refrigerant having been heated in said chamber, said refrigerant being pressurized and cooled in said condenser;
coupling at least one coil to said condenser and leading said at least one coil to a region to be cooled, said at least one coil having a first portion coupled to said condenser, a second portion downstream from said first portion, and a third portion downstream of said second portion;
providing said second downstream portion with an orifice, to freely expand said refrigerant to cause cooling of said region to be cooled; and leading said third downstream portion from the region to be cooled back to said chamber, and
wherein said at least a portion of said heat generated within the system is recirculated to cool said region to be cooled.

21. The method of claim 20, wherein said refrigerant comprises any of ammonia and water, a solution of LiBr and water, and lithium chloride and water.

22. The method of claim 20, further comprising:
providing a source of heat, said source of heat comprising a component within said apparatus that becomes heated when said apparatus is powered.

23. The method of claim 20, wherein a structure in said region to be cooled comprises at least one of a fan and a fan motor, a computer chip, computer circuitry and a circuit board, said structure being electrically powered.

24. The method of claim 20, wherein a structure in said region to be cooled comprises a computer server unit.

25. The method of claim 20, further comprising:
positioning an auxiliary electric heater coil adjacent to said chamber receiving said heat.

26. The method of claim 25, wherein said auxiliary electric heater coil starts a refrigeration cycle.

27. The method of claim 25, further comprising:
maintaining said auxiliary electric heater coil in an actuated state during operation of said apparatus to augment said heat being provided to said chamber.

28. The method of claim 20, wherein said second downstream portion of said at least one coil is directly contacted with a structure to be cooled.

29. The method of claim 20, further comprising:
providing a solid conductive member, wherein said second downstream portion of said at least one coil is indirectly contacted with a structure to be cooled, via said solid conductive member.

30. A method of cooling a portion of a system, comprising:
generating waste heat by said system; and
using at least a portion of the waste heat to cool a portion of the system producing the waste heat.

31. The method of claim 30, wherein said at least a portion of the heat is recycled, and is redirected to a portion of the system that requires cooling.

32. A cooling apparatus for a system which generates heat therein, said apparatus comprising:
a chamber for receiving at least a portion of said heat, by at least one of conduction and forced air, said chamber containing a refrigerant therein;
a condenser for receiving said refrigerant having been heated in said chamber, said refrigerant being pressurized and cooled in said condenser; and
at least one coil coupled to said condenser and leading to a region to be cooled, said at least one coil having a first portion coupled to said condenser, a second portion downstream from said first portion, and a third portion downstream of said second portion,
wherein said second downstream portion contains an orifice for free expansion of the refrigerant to cause cooling of said region to be cooled,
wherein said third downstream portion leads from the region to be cooled back to said chamber, and
wherein a structure in said region to be cooled comprises a server unit.

* * * * *